United States Patent [19]

Turman

[11] Patent Number: 4,975,206
[45] Date of Patent: Dec. 4, 1990

[54] COOKING OIL FILTERING METHOD USING AUTOMATIC SEQUENCE CONTROLLER FOR PLURAL VATS

[76] Inventor: William C. Turman, 32302 Alipaz, #46, San Juan Capistrano, Calif. 92675

[21] Appl. No.: 345,956

[22] Filed: May 1, 1989

Related U.S. Application Data

[62] Division of Ser. No. 135,597, Dec. 21, 1987, Pat. No. 4,826,590.

[51] Int. Cl.⁵ .............................................. B01D 17/12
[52] U.S. Cl. .................................... 210/805; 210/806; 210/142; 210/138
[58] Field of Search ................ 210/233, DIG. 8, 436, 210/392, 393, 805, 806, 98, 142, 181, 195.1, 258, 335, 340, 341, 438

[56] References Cited

U.S. PATENT DOCUMENTS

| | | |
|---|---|---|
| 1,783,924 | 12/1930 | McKinley .......................... 210/493.4 |
| 2,440,680 | 5/1948 | Gerin et al. ........................... 210/104 |
| 2,482,302 | 9/1949 | Summers et al. .................... 210/190 |
| 2,894,633 | 7/1959 | Collins ................................. 210/341 |
| 3,167,435 | 1/1965 | Hall .............................. 210/DIG. 8 |
| 3,550,776 | 12/1970 | Hamilton ............................... 210/94 |
| 3,759,388 | 9/1973 | Thomason ........................... 210/167 |
| 3,968,741 | 7/1976 | Hunt .............................. 210/DIG. 8 |
| 4,231,768 | 11/1980 | Seibert et al. ......................... 55/179 |
| 4,295,966 | 10/1981 | LeBlanc et al. ..................... 210/436 |
| 4,320,005 | 3/1982 | DeGraffenreid .................... 210/232 |
| 4,370,152 | 1/1983 | Luper .................................... 55/281 |
| 4,411,791 | 10/1983 | Ward .................................... 210/649 |
| 4,502,955 | 3/1985 | Schaupp ............................. 210/149 |
| 4,668,393 | 5/1987 | Stone .................................... 210/304 |
| 4,824,564 | 4/1989 | Edwards et al. ..................... 210/436 |
| 4,826,590 | 5/1989 | Turman ......................... 210/DIG. 8 |

Primary Examiner—Richard V. Fisher
Assistant Examiner—Cynthia L. Nessler
Attorney, Agent, or Firm—Brown, Martin, Haller & McClain

[57] ABSTRACT

A cooking oil filtering method comprises the steps of connecting the drain outlets of a series of cooking vats to a pre-filter via inlet valves controlling the connection of each vat to the pre-filter, connecting the outlet of the pre-filter to a second filter assembly, connecting the outlet of the second filter assembly to the inlets of the cooking vats via return valves controlling the return of oil to each vat, and controlling operation of a pump and opening of the inlet and return valves to successively pump oil from each vat in turn through the pre-filter and filter assembly before returning it to the vat.

4 Claims, 2 Drawing Sheets

COOKING OIL FILTERING METHOD USING AUTOMATIC SEQUENCE CONTROLLER FOR PLURAL VATS

This is a division of Ser. No. 135,597, filed Dec. 21, 1987, now U.S. Pat. No. 4,826,590.

BACKGROUND OF THE INVENTION

The present invention relates to a method for re-circulating and filtering cooking oil or fat from a cooking vat or broiler.

Most restaurants and large kitchens employ one or more large cooking vats containing a suitable heated cooking oil for cooking foods such as fried chicken, french fries and the like. The cooking oil in the vats becomes dirty after a time as a result of small food particles which separate from the food being cooked. Thus the oil must be cleaned, and must be replaced periodically with new oil, resulting in expense and lost cooking time. Also, the vat itself must periodically be emptied and cleaned. Some cooking vats are provided with individual re-circulating filters for removing large size particles from the oil. However, these do not clean all the particles from the oil, and the oil must still be replaced relatively often.

SUMMARY OF THE INVENTION

It is an object of the present invention to provide an improved system for filtering cooking oil.

According to the present invention, a cooking oil filtering system is provided which comprises a pre-filter for removing large particles from cooking oil, and a second filter assembly connected to the pre-filter outlet for removing smaller size particles from the oil. A filter inlet manifold connected to the pre-filter inlet includes a series of inlet passageways for connection to a series of cooking vat drain outlets. An inlet valve in each of the inlet passageways controls connection of the respective cooking vat to the pre-filter. A filter outlet or return manifold is connected to the outlet of the second filter assembly and has a series of outlet passageways for connection to a series of cooking vat inlets. An outlet or return valve is connected in each of the outlet passageways to control the return of cleaned oil to the respective cooking vat. A pump is provided in the system for circulating oil from the cooking vats through the filters and back into the cooking vats.

A suitable control assembly is provided for controlling opening and closing of the inlet and outlet valves. This may comprise a suitably programmed timer and sequence controller. The controller may be set up so that the oil in each vat in a series is cleaned in turn, and clean oil is returned to the vat before the next vat is connected to the filter system. This allows the cooking vats to remain in operation while the oil in any one of the vats is being filtered. A suitable sequence of operations would be first to open an inlet valve connecting a first vat to the pre-filter, simultaneously opening the outlet valve in the connecting passageway between the second filter assembly and the first vat. At this point, all other inlet and outlet valves will be closed. The pump will then start to circulate oil from the first vat through the filters and back to the vat. The inlet and outlet valves to the first vat are then closed while the second vat in the system is connected to the pre-filter, and so on until the oil in all the cooking vats has been filtered.

According to another aspect of the invention a method of filtering cooking oil is provided, comprising the steps of connecting the outlet drains of a series of cooking vats to a pre-filter, connecting the pre-filter outlet to a second filter assembly, and connecting the outlet from the second filter assembly to the inlets of each of the cooking vats, and pumping oil from each of the cooking vats in turn through the pre-filter and second filter assembly back to the cooking vat.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
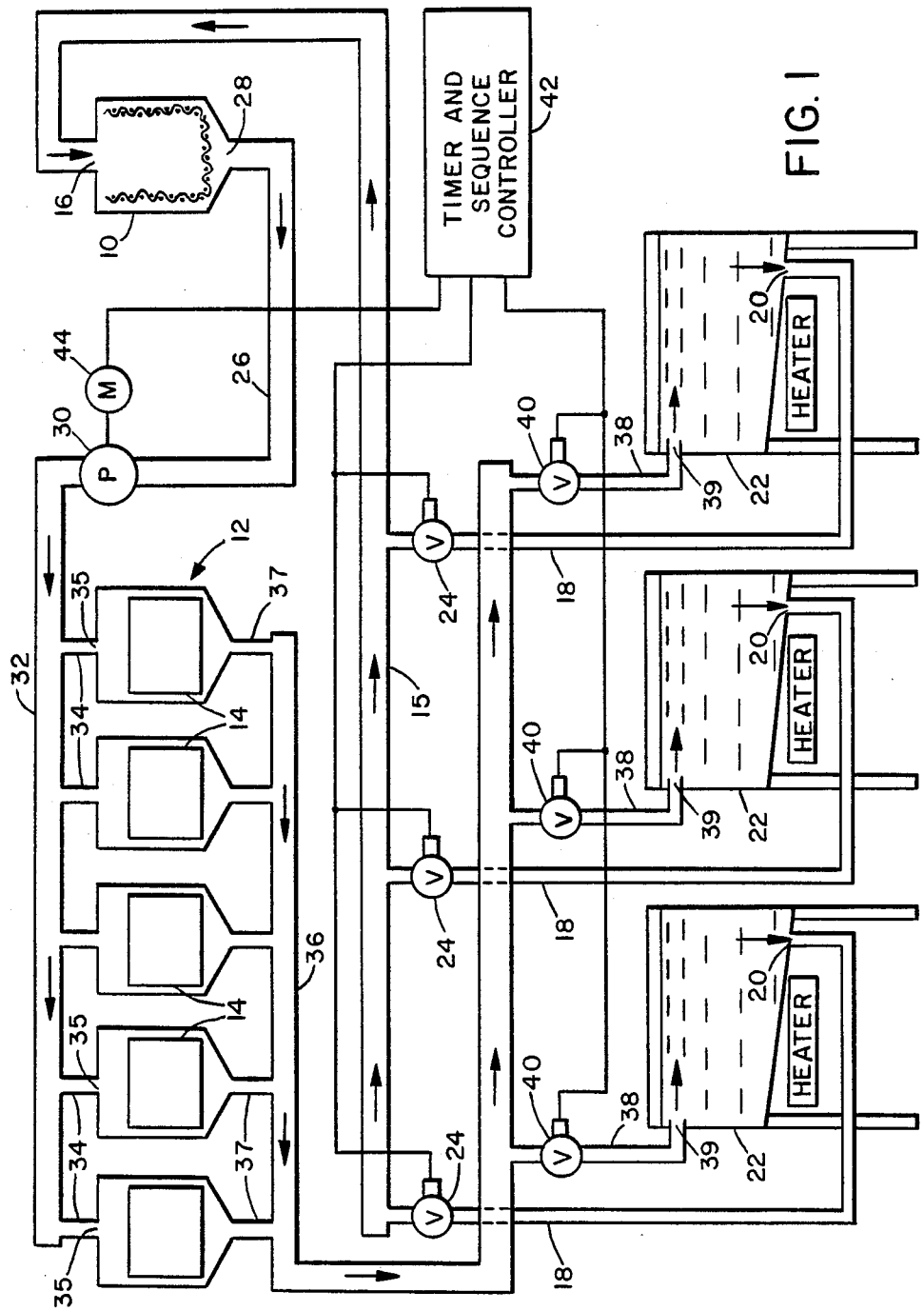
FIG. 1 is a schematic illustration of a complete cooking oil filter system according to a preferred embodiment of the invention.

FIG. 1 of the drawings shows a preferred embodiment of the cooking oil filter system according to the invention. The system basically comprises a pre-filter 10 for removing relatively large size particles from cooking oil, and a second filter assembly 12 for removing smaller particles from the oil. The second filter assembly in the preferred embodiment shown comprises a series of individual filters 14, described in more detail below in connection with FIG. 2.

An inlet manifold 15 connected to the pre-filter inlet 16 comprises a conduit connected to a series of inlet passageways 18 for connection to suitable outlets 20 provided on a series of cooking vats 22. Although three cooking vats are shown in FIG. 1, it is clear that a greater or lesser number of cooking vats could be connected to the system with the provision of a suitable number of passageways 18. An inlet or intake valve 24 is provided in each of the inlet passageways.

A passageway or connecting pipe 26 connects the pre-filter outlet 28 via pump 30 to an intake manifold 32 of the second filter assembly. Intake manifold 32 includes a series of intake passageways 34 each connected to the inlet 35 of a respective one of the individual filters 14. An output or return manifold 36 connects the outlets 37 of each of the filters to a series of return passageways 38 for connection to suitable inlets 39 provided on each of the cooking vats. A return valve 40 is provided in each of the return passageways.

All of the connecting manifolds and passageways in the system are built to handle normal cooking fat temperatures up to 400° F. The arrows in FIG. 1 illustrate the flow of oil through the filter system. A suitable timer and sequence controller 42, which may comprise a suitably programmed microprocessor, is connected to each of the intake and return valves and to a motor 44 for operating the pump 30 to control the circulation of oil through the system. The controller provides suitable electrical signals to the valves to control opening and closing of the valves, which may be solenoid operated valves, for example.

In the preferred embodiment of the invention, pre-filter 10 is a simple, stainless steel wire basket filter for removing larger particles from the oil circulating through it. The second filter assembly comprises a series of identical, smaller gauge filters, one of which is shown in more detail in FIG. 2 of the drawings.

Figure 2:
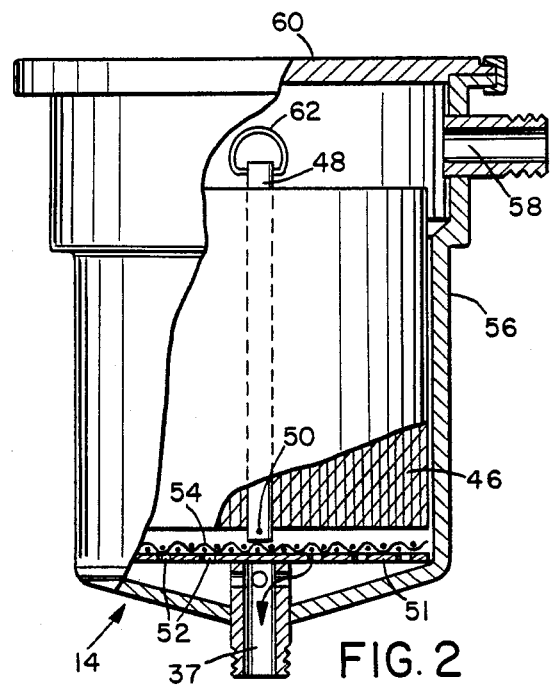
FIG. 2 is a side elevation view, with portions cut away, of one filter unit of the system.
Figure 3:
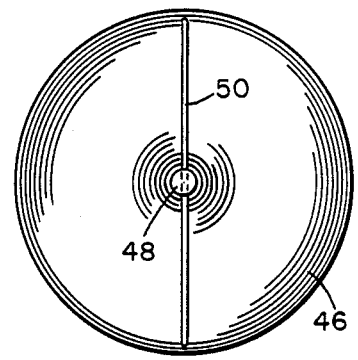
FIG. 3 is a lower end view of a spiral wound filter element.

As shown in FIG. 2, each filter 14 includes a filtering device comprising a roll 46 of filter paper spirally wound on a dowel 48. The dowel has a transverse pin 50 at one end extending across the end of the roll to retain it on the dowel, as indicated in FIG. 3. The filtering device sits on base plate 51 having a series of openings 52 to allow oil to pass through the plate 51 and into outlet passageway 37. A wire mesh 54 covers the upper surface of plate 50 for additional filtering, and the entire filter assembly is enclosed in a cylindrical housing 56 having an inlet opening 58 at its upper end for connection to one of the intake passageways 34. The housing 56 has a removable cover or lid 60 to allow periodic replacement of the filter roll 46. The dowel 48 has a ring 62 at its upper end to allow the filter roll to be lifted out of the housing easily when the roll needs replacing. The individual filters 14 can thus be relatively inexpensive and small scale, with the number of filters chosen according to the volume of oil to be handled in the system. The filter rolls can be changed quickly and easily with little interruption to normal operations. In a preferred embodiment of the invention filter rolls of about 5½ inches in diameter and 3½ to 4 inches in length were used. An optimum oil flow rate was found to be ½ gallon/minute/filter roll. Thus in a system having 4 filter elements, a pump having a capacity of about 1.8 gallons per minute may be used for optimum efficiency.

Oil entering the housing 56 via inlet 35 thus travels downwardly through roll 46 and mesh 54 into the outlet 37, with the majority of the relatively small scale particles in the oil being trapped in the roll of paper 46.

The timer and sequence controller may be programmed to connect each of the cooking vats to the system in sequence so that the oil in each vat is cleaned and returned to that vat before connection of the next vat. In this manner all of the vats can remain in use at all times so that cleaning can be carried out during normal cooking hours, reducing manpower requirements. Before start-up, all of the inlet and outlet valves will be closed. On initiation of the programmed filtering sequence, the inlet valve 24 connected to the drain of a first cooking vat is opened and the pump motor is turned on to pump oil through the pre-filter 10.

The oil will circulate through the pre-filter and via intake manifold 32 through the filters 14 of the second filter assembly, so that the majority of particles are removed from the oil. The oil return valve 40 will be open to a)low the cleaned oil to return to the vat. Once the oil has been sufficiently filtered, as determined by a timer in the controller, for example, the inlet and return valves connected to the second vat are opened to allow the oil in that vat to be pumped out and through the filters, while the inlet and return valves connected to the first vat are closed. The sequence is continued until the oil in all the vats has been cleaned. At this point the sequence may be repeated, or the system may be turned off until another cleaning sequence is necessary.

The controller may also be provided with a programmed sequence to allow the filter rolls to be replaced when necessary. In this sequence, all inlet valves will be closed, all return valves will be open and an additional valve venting the system to the atmosphere will be opened. This allows air to enter and purge oil from the filter. After a sufficient time lapse, the pump is turned off so that the filters can be changed, after which the timer is re-started for normal cleaning operation.

Figure 4:
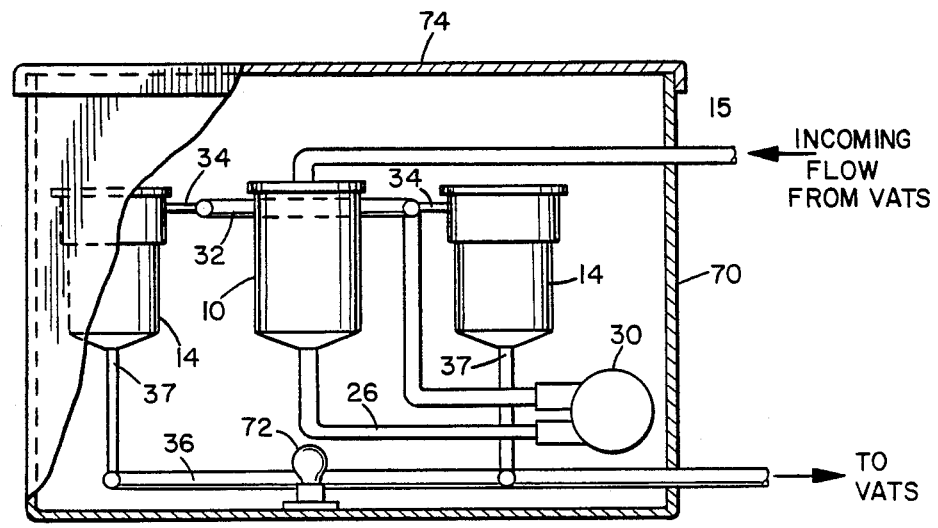
FIG. 4 is a side elevation view, with the housing cut away, of an enclosed and heated filter assembly.

FIG. 4 of the drawings shows a modification of the system for use with cooking vats using digestible solid cooking fat, such as lard, shortening or the like, which normally melts at around 100° F. In this case the fat must be kept liquid as it circulates through the filter system. The pre-filter 10 is mounted at the center of a closed cylindrical housing 70, with the filters 14 mounted in a circular array around pre-filter 10, as indicated in FIG. 4. A suitable heater, such as a 100 Watt light bulb 72 as shown in the drawings, is provided in the housing. The light bulb or heater 72 may be turned on manually or under the control of controller 42 when the system is on or off as needed to keep the fat liquid. The intake and output manifolds are suitably modified for connection to the inlets and outlets of the filters in the circular array, as indicated in FIG. 4. Pump 30 is preferably also mounted inside the housing as shown. Housing 70 has a removable cover 74 to allow the pre-filter 10 to be cleaned and the filter rolls of filter 14 to be replaced. In this modified embodiment the system is otherwise identical to that shown in FIGS. 1 to 3 and like reference numerals are used as appropriate to indicate equivalent parts.

With the filtering system of this invention cooking oil is cleaned quickly and efficiently, and can be kept clean enough to use for a much longer period before replacement with new oil. For example, with cooking vats connected to a single wire basket filter for cleaning, oil normally needs replacing at least twice a week. With the system of this invention, the oil needs replacing considerably less frequently, in practice no more often than once a month. The system can be connected to a number of vats to be cleaned sequentially, and thus is more economical since there is no need to purchase and operate a separate system for each cooking vat. It can be programmed to operate a cleaning sequence automatically during normal cooking hours, significantly reducing operator time during the cleaning process.

Although a preferred embodiment of the invention has been described above by way of example only, it will be understood by those skilled in the field that modifications may be made to the disclosed invention without departing from the scope of the invention, which is defined by the appended claims.

I claim:

1. A method of filtering cooking oil from a series of cooking vats, comprised the steps of:
   connecting the drain outlets of a series of cooking vats to a pre-filter via inlet valves controlling the connection of each vat to the pre-filter;
   connecting a pre-filter outlet to a second filter assembly;
   connecting an outlet of the second filter assembly to the inlets of a series of cooking vats via return valves for controlling the return of filtered oil to the cooking vats;
   connecting a pump to pump oil from a cooking vat through the pre-filter and second filter assembly;
   connecting the pump and each of the inlet and return valves to an automatic sequence controller; and
   programming the sequence controller to carry out an automatic filtering sequence in which operation of the pump and opening of the inlet and return valves are controlled to successively pump oil automatically from each vat in turn through the pre-filter and filter assembly, and return filtered oil to the vat.

2. The method as claimed in claim 1, wherein the step of pumping oil through the filter assembly comprises pumping oil through a series of identical filter housings connected in parallel and having removable filter elements, and further including a procedure for replacing the filter elements at selected intervals, the filter element replacement procedure comprising opening all the return valves simultaneously and at the same time venting the system to the atmosphere, operating the pump and allowing oil to purge from the filters for a predetermined interval, turning off the pump and removing each filter element by lifting it from its filter housing and replacing a new filter element in each housing.

3. The method as claimed in claim 1, wherein the step of pumping oil through the second filter assembly comprises pumping oil through a series of identical outer filter housings connected in parallel, the oil being pumped between an inlet at one end of each filter housing and an outlet at the opposite end through a roll of filter paper wound on an imperforate dowel.

4. A cooking oil filtering method, comprising the steps of:
   connecting a series of containers of cooking oil to be filtered to a pre-filter via inlet valves controlling the connection of each container to the pre-filter;
   connecting each of the containers to an outlet of a second filter assembly via return valves for controlling the return of filtered oil to the respective containers;
   connecting the outlet and return valves and a pump for pumping oil from the containers through the pre-filter and filter assembly to an automatic controller for controlling operation of the pump and opening and closing of the valves according to a predetermined control sequence; and
   operating the automatic controller to successively pump oil from each container in turn through the pre-filter and second filter assembly and to return filtered oil to the container while the inlet and return valves of the other containers are closed.

* * * * *

UNITED STATES PATENT AND TRADEMARK OFFICE
CERTIFICATE OF CORRECTION

PATENT NO. : 4,975,206

DATED : December 4, 1990

INVENTOR(S) : William C. Turman

It is certified that error appears in the above-identified patent and that said Letters Patent is hereby corrected as shown below:

ON THE TITLE PAGE: insert Item [73] Assignee's name which should read --FILTER SYSTEMS, INC.--

Signed and Sealed this

Twenty-ninth Day of September, 1992

Attest:

*Attesting Officer*

DOUGLAS B. COMER

*Acting Commissioner of Patents and Trademarks*